Dec. 24, 1929.   P. D. TREAR   1,741,042
MACHINE FOR CUTTING MEAT, ETC
Filed Aug. 19, 1925
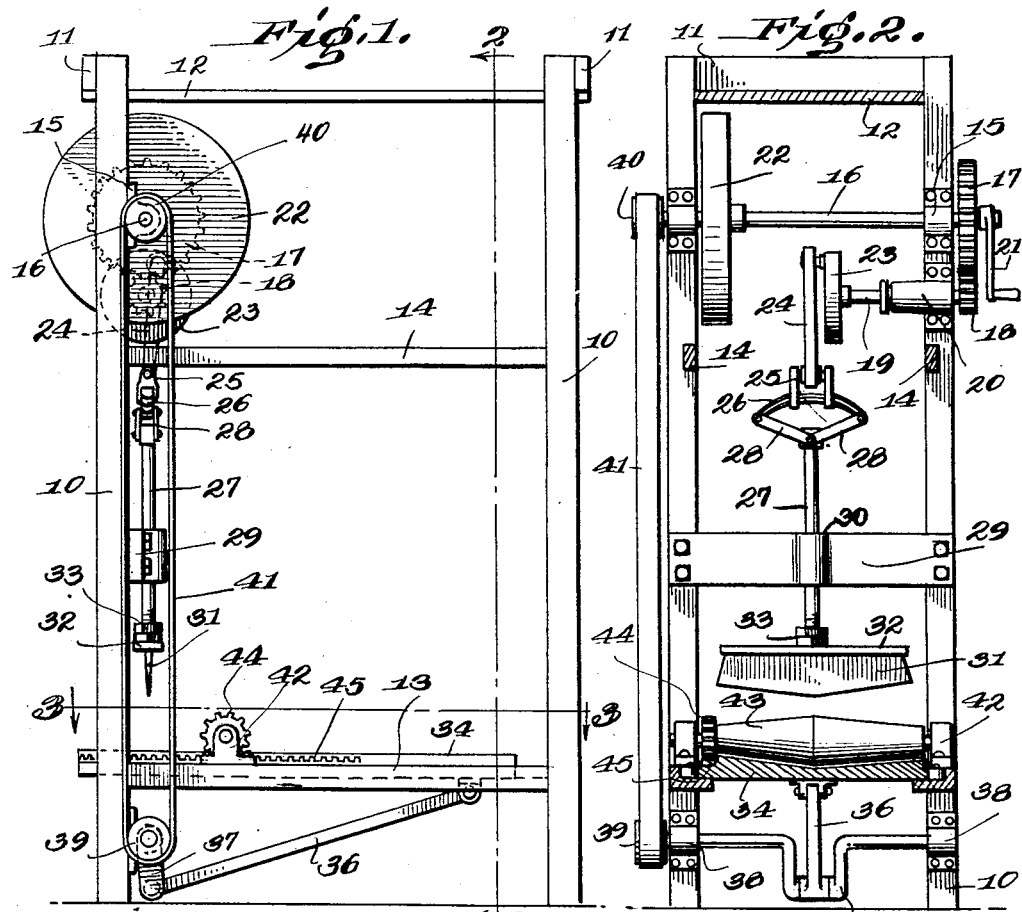
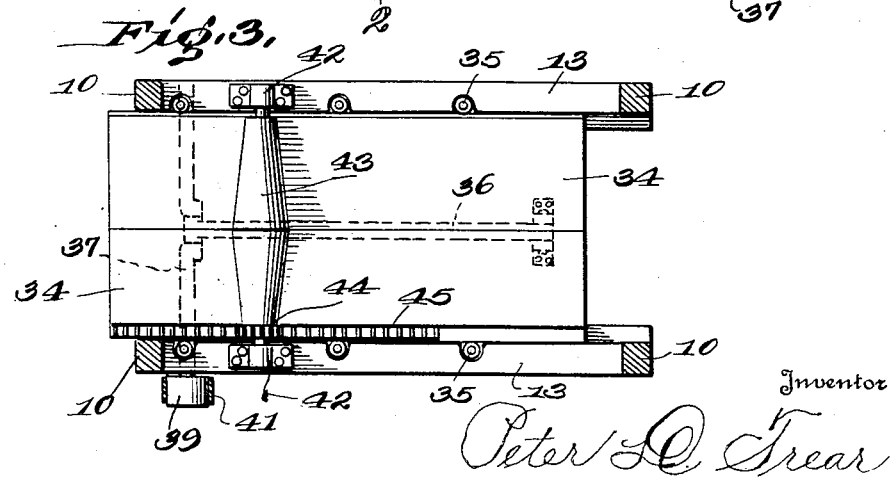
Inventor
Peter D. Trear Patented Dec. 24, 1929

1,741,042

UNITED STATES PATENT OFFICE

PETER D. TREAR, OF LEAVENWORTH, KANSAS

MACHINE FOR CUTTING MEAT, ETC.

Application filed August 19, 1925. Serial No. 51,138.

My invention relates to a machine for chopping meat, etc., and has for its principal object to provide novel and improved mechanism of this general character which may be used for chopping meat and for other domestic purposes.

Another object of the invention is to provide a machine of this type with a reciprocating arm having a yieldable section for use in conjunction with a reciprocating table having a roller positioned slightly thereabove and turning in an opposite direction from the movement of the table in order to squeeze or force liquids from articles engaged between said roller and reciprocating table.

It is also an object of the invention to provide a machine as above indicated, which is simple and substantial in construction, can be manufactured economically, and will be thoroughly efficient and practical in use.

With the foregoing and other objects in view, which will be apparent as the description proceeds, the invention resides in the construction and arrangement of parts of the machine, as hereinafter described and claimed, it being understood that immaterial changes can be made within the scope of what is claimed, without departing from the spirit of the invention.

The invention is illustrated in the accompanying drawings, wherein:

Figure 1 is a side elevation of my improved machine,

Figure 2 is a vertical section taken on line 2—2 of Figure 1, and

Figure 3 is a horizontal section taken on line 3—3 of Figure 1.

Referring to the drawings, the numeral 10 designates a series of uprights or vertical supports, preferably four in number, connected at their upper ends by cross members 11 to which is secured an upper wall or closed top 12, said uprights being connected at their ends by horizontal cross-pieces 13 which serve to wall the posts in their proper position and form supports for certain parts of the mechanism of the machine, the uprights being further walled by intermediate cross-pieces 14.

On the inner sides of the uprights 10 at one side of the machine are attached bearings 15 in which a shaft 16 rotates, and on one of the projecting ends of this shaft 16 is fixed a relatively large gear 17 which meshes with a smaller gear 18 fixed to a short shaft 19 journaled in a bearing-box 20 attached to one of the uprights, the main shaft 16 being turned by a crank 21 fixed to the end thereof beyond gear wheel 17. While I have shown a hand operated crank for rotating the shaft, it is to be understood that any improved motive power may be used for such purpose. Also fixed on the main shaft is a fly-wheel 22, for steadying the motion of the machine in operation, said fly-wheel being located adjoining the upright opposite that to which the journal 20 is attached so as to be out of the way of shaft 19 and parts carried thereby.

On the inner end of the short shaft 19 is a disk 23 to which is attached a pitman connected at its lower end to the center portion of a leaf spring 26 by means of links 25, said spring being connected at its ends to the upper end of a vertically reciprocating rod 27 by links 28. The reciprocating rod 27 is slidably supported by cross-bar 29 extending between the uprights which support the shafts 16 and 19 and provided with an opening 30 through which said rod passes, and adjustably mounted on the lower end of this reciprocating rod is a horizontal cutting blade 31 with its cutting edge inclined slightly upwardly from the center, as clearly illustrated in Figure 2 of the drawings, said blade being reinforced at its upper edge, as indicated at 32, and provided centrally with a boss 33 into which is threaded the lower end of the reciprocating rod for adjustment of the blade vertically thereon, for the purpose hereinafter described, the adjustment being secured by a binding nut.

The horizontal cross-pieces 13 are substantially L-shape in cross section to form ledges for supporting a sliding table 34, and are provided with recesses adjoining the ledges to receive rollers 35 for guiding the table in its reciprocating motion on the ledges. The table 34 has attached to one end thereof a crank arm 36 pivotally connected to and extending from a crank shaft 37 supported in bearings at the lower ends of the forward uprights of the machine and driven from shaft 16 by belt 41 passing over pulleys 39 and 40 on the ends of said shafts 37 and 16 respectively, whereby the table is reciprocated in a horizontal plane while the blade 31 is reciprocated in a vertical plane.

The table 34 is inclined upwardly in opposite directions from the center to correspond with the cutting edge of the blade 31, so that said blade will engage across the table and the chopped material thereon will collect towards the center.

Extending across the table in the rear of the reciprocating knife-blade 31 is a roller 43 supported at its ends in bearings 42 42 mounted on the cross pieces 13, said roller being tapered from the center to each end to correspond with the upper surface of the table with which it cooperates and is turned by means of a pinion 44 in mesh with a rack 45 secured on one of the cross-pieces 13, as shown in Fig. 3.

From the foregoing, it can be seen that when the crank handle 21 is turned the blade 31 will be reciprocated to and from the reciprocating table for cutting material thereon, the leaf-spring 26 providing a yielding connection between the blade and its operating shaft to compensate in motion for any obstruction to the full stroke of the blade, and in addition to being cut by the knife the material will be further operated on by the roller as the table is reciprocated below said knife and roller, the turning of the roller in opposition to the movement of the table providing a more effective rolling or squeezing of the material, and when the device is used for working butter, a series of small openings is provided at the lowermost portion of the table which can be plugged up during the working of the butter and opened after such working to permit the liquid to drain off. In addition to its use for working butter the machine may be employed for chopping and mincing meats, vegetables, etc., and for wringing clothes between the roller and table, in the latter instance the pitman 24 being disconnected to prevent operation of the knife blade.

Having thus described my invention, what I claim as new is:

1. A device of the character described comprising a frame, a shaft mounted on said frame for rotary movement, a pitman, means for eccentrically attaching said pitman to said shaft, a reciprocating rod in said frame, a leaf spring attached to the pitman intermediate its ends, a series of links pivotally connected to the ends of said leaf spring and to one end of the reciprocating rod, and a blade attached to the lower extremity of said rod.

2. A device of the character described comprising a frame, a pitman and means for operating the same to convert a rotary motion into a reciprocating motion, a vertically reciprocating rod mounted in said frame and having connection with said pitman, a knife blade carried by said reciprocating rod, a table slidably arranged below said knife blade, a crank shaft carried by said frame, a link connecting said crank and said table for reciprocating the latter when said crank is rotated, and means connecting said crank with the pitman driving mechanism for rotating said crank when the pitman is operated and reciprocate the said table.

3. A device of the character described comprising a frame, a pitman mounted in said frame, means for operating the pitman, a vertically reciprocating rod in said frame and having connection with said pitman, a knife blade carried by said rod, a table slidably arranged below said knife blade, a crank shaft carried by said frame, a link connecting said crank shaft and said table for reciprocating the latter when said crank shaft is rotated, means connecting the crank shaft with the means for operating the pitman for rotating said crank shaft when said pitman is operated for reciprocating said table, a roller positioned slightly above said table, a gear carried by said roller, and a rack secured to the frame and with which said gear meshes to rotate said roller upon sliding movement of said table.

4. A device of the character described comprising a frame, a rod reciprocating vertically in said frame, means for reciprocating said rod, a blade yieldably connected to the lower end of said rod, a table slidably mounted beneath said blade, said table having the upper surface thereof inclined in opposite directions from the longitudinal center thereof, said blade having its cutting edge in opposite directions to correspond with the upper surfaces of the table, and a roller arranged above the table and adapted to be rotated upon sliding movement of the table, said roller having its opposite ends cone-shaped so that said roller conforms to substantially the same shape as the inclined surfaces of the table.

In testimony whereof, I have affixed my signature.

PETER D. TREAR.